United States Patent
Barthelemy et al.

(12)

(10) Patent No.: US 6,916,870 B2
(45) Date of Patent: Jul. 12, 2005

(54) REFRACTORY MATERIAL PRECURSOR PASTE

(75) Inventors: Christian Barthelemy, Voiron (FR); Serge Marsaud, Samois sur Seine (FR); Luc Nicolas, Magny-Saint-Medard (FR)

(73) Assignees: Aluminium Pechiney, Paris (FR); Porteret Beaulieu Industrie SA, Bezouotte (FR)

( * ) Notice: Subject to any disclaimer, the term of this patent is extended or adjusted under 35 U.S.C. 154(b) by 48 days.

(21) Appl. No.: 10/239,875

(22) PCT Filed: Apr. 9, 2001

(86) PCT No.: PCT/FR01/01066
§ 371 (c)(1),
(2), (4) Date: Dec. 10, 2002

(87) PCT Pub. No.: WO01/79136
PCT Pub. Date: Oct. 25, 2001

(65) Prior Publication Data
US 2004/0012111 A1 Jan. 22, 2004

(30) Foreign Application Priority Data
Apr. 12, 2000 (FR) .......................... 00 04724

(51) Int. Cl.$^7$ .......................... C08K 5/24; C08K 3/22
(52) U.S. Cl. .................. 524/265; 524/266; 524/430; 524/437
(58) Field of Search ................ 524/265, 266, 524/430, 437

(56) References Cited

U.S. PATENT DOCUMENTS 5,262,495 A * 11/1993 Gerber ...................... 525/506
6,632,527 B1 * 10/2003 McDaniel et al. .......... 428/402

FOREIGN PATENT DOCUMENTS

WO         97/28941         8/1997

* cited by examiner

*Primary Examiner*—Peter D. Mulcahy
(74) *Attorney, Agent, or Firm*—Dennison, Schultz, Dougherty & MacDonald

(57) ABSTRACT

The invention concerns fibre-free precursor pastes of refractory material characterised in that they contain an elastomeric polymer filled with alumina and alumina hydrate and a silylating agent, generating Si—O bonds. The invention also concerns the method for making said paste and the material and the use thereof.

26 Claims, No Drawings

REFRACTORY MATERIAL PRECURSOR PASTE

FIELD OF THE INVENTION

The invention concerns the area of materials that are initially soft and flexible for refractory use. More particularly, it concerns materials containing precursor elements of a ceramic to which they convert during their rise in temperature, acquiring their refractoriness.

DESCRIPTION OF RELATED ART

Soft refractory materials are used in numerous areas such as the steel or aluminium industries. They are used in the form of paper, cloth, rope.

The production of soft refractory materials involves the use of refractory fibres which are their chief constituent. Asbestos was used on industrial level up until its interdiction connected with its proven hazardousness. These fibres were then replaced by refractory ceramic fibres which are amorphous silicates generally obtained by the fusion of alumina and silica. The use of these fibres in soft refractory materials underwent a major increase on account of their insulating and refractory properties, providing substantial gains in terms of energy consumption in industrial processes requiring high temperatures. Nonetheless, some doubts remained as to their harmlessness vis-à-vis humans, in particular in the event of prolonged exposure. Data collected in Europe since 1991 and research on animals have shown that the risk of onset of illnesses induced by prolonged exposure to refractory fibres is a real risk. Consequently, on 10 Nov. 1997, the European Commission classified refractory ceramic fibres as a hazardous product under category II (substances which are to be considered potentially carcinogenic for man). Henceforth, skull labelling is required and full information on the risks for human health. This classification does not imply the prohibited use of refractory fibres in industrial environments but some restrictions and regulations have already been introduced into the legislation of member states.

The manufacturers of refractory ceramic fibres are working hard to find replacement solutions and some products are emerging such as bio-soluble fibres containing dolomite, but the temperature at which these materials can be used remains limited. Other materials such as high purity silica, cordierite, mullite-zirconium or high purity aluminas are being tested, but at the present time their form and cost prohibit their use for most applications.

The problem therefore remains, in respect of soft refractory materials, of finding materials which do not contain refractory ceramic fibres, have good insulating and refractory properties and whose cost is economically acceptable in an industrial environment.

SUMMARY OF THE INVENTION

The first subject of the invention is a soft paste able to fulfil the same functions as fibre-based products currently used as precursors for soft refractories. The paste of the invention is characterized in that it contains an elastomer polymer, a silylation agent (creator of Si—O bonds), a mixture of alumina and alumina hydrate and optionally a plasticizer. During its rise in temperature, the organic part is removed and leaves behind a refractory solid chiefly made up of alumina.

The second subject of the invention is a method for manufacturing the paste of the invention comprising the following steps:

a) Preheating a mixer to a temperature of between 40 and 60° C., preferably between 50° and 60° C.

b) Placing in the mixer the elastomer polymer, silylation agent, alumina and alumina hydrate.

c) Mixing the contents until a homogeneous paste is obtained.

The third subject of the invention is a soft, refractory precursor having various forms: granules, rods, rolls, sheets, strips.

The fourth subject of the invention is the use of the refractory precursor paste as an outer sheath or packing for an electric cable or as a fireproof seal or panel.

DETAILED DESCRIPTION OF THE INVENTION

The first subject of the invention is a precursor paste for a refractory material characterised in that it contains an elastomer polymer containing firstly a mixture of alumina and alumina hydrate and secondly a silylation agent.

The silylation agent is an agent which sets up Si—O bonds; as an example the following may be cited: trialkoxysilanes, whether hydrolysed or not, silsesquioxanes, silazanes.

The alumina entering into the composition of the paste is a ground alumina. This alumina has a typical particle size of 05 to 10 microns, corresponding to a specific surface area of between 0.5 and 15 $m^2/g$.

The alumina hydrate entering into the composition has a typical particle size of between 3 and 20 microns, preferably between 5 and 15 microns. Alumina hydrate is well known in the area of plastic materials in which it is used as a component on account of its fireproofing qualities; it is an indispensable component of the paste in order to prevent combustion of the polymer during the first temperature rise and to enable ceramisation. It may be replaced by magnesium hydroxide which is also used for fireproofing some polymers.

It is known that the silylation agent creates a set of Al—O—Si bonds. The applicant has found that these bonds rigidify the paste as soon as the polymer reaches temperatures at which it is likely to flow.

This rigidifying often occurs over time at storage temperatures, which must be avoided to solve the problem raised.

The applicant has found that this problem does not arise if a trialkoxy silane is used of epoxy type and more especially (3 glycidoxy propyl) trimethoxysilane previously hydrolysed in silanol, or else a silane of amino type and more particularly non-hydrolysed N-aminoethyl-3 amonopropyltrimethoxysilane. One possible alternative is the use of (poly)methylsilsesquioxane or polysilazane in the non hydrolysed state.

It is also found that some well known silylation agents are not suitable. (4-aminopropyl)triethoxysilane for example does not give a solid product at high temperature whereas (mercaptoethyl) trimethoxysilane and poly(phenyl-propylsilsesquioxane) causes early, rapid rigidifying of the soft product at room temperature.

Elastomer polymer belongs to the ethylene propylene diene family. The applicant achieved very good results with ethylene propylene diene monomer, better known under the initials EPDM.

To facilitate manufacture of the paste, it is advisable to add a plasticizer to proportions in the order of 0 to 10% of the total weight of the paste.

The proportions of the different components differ according to the subsequent use of the paste. A typical range for most usual applications of soft refractories is:

| | |
|---|---|
| Alumina: | 30 to 40% by weight |
| Alumina hydrate or magnesium hydroxide | 30 to 40% by weight |
| Silylation agent | 5 to 15% by weight |
| Polymer | 10 to 20% by weight |
| Plasticizer | 0 to 10% by weight |

This paste can be reinforced with fibreglass.

The second subject of the invention is a process for manufacturing a precursor paste for a refractory material characterized in that it comprises the following steps:

a) Preparation of the Silylating Agent by Hydrolysis

This preparation of the silylating agent by hydrolysis may be an optional step in the process.

The preparation of the silylation agent (when necessary) is conducted in a separate, stirred container to which water is added whose pH is previously adjusted to the value specifically recommended for performing hydrolysis of the agent to be used. The proportions of the water must be greater than stoichiometric proportions. The ratio of the number of moles of water to the number of moles of silylation agent typically lies between 4 and 7. It is advisable for hydrolysis to be complete. The stirring time is a few minutes. The operation has been completed when the solution becomes clear.

b) Preheating of a Mixer

Preheating of the mixer is conducted up to a temperature of between 40 and 60° C., preferably between 40° C. and 50° C. If preheating is insufficient, the polymer will not reach sufficient viscosity. If the mixer temperature is too high, the silylation agent reacts too quickly and causes early rigidifying of the paste.

c) Placing the Polymer in the Mixer with the Silylation Agent, Alumina and the Alumina Hydrate or Magnesium Hydroxide It is sometimes preferable to add a plasticizer to proportions in the order of 0 to 10% of the total weight of the paste. This additive also acts as lubricating agent.

d) Mixing the Mixer Contents Until a Homogeneous Paste is Obtained

The stirring speed of the mixer may be adapted as the contents are added. Operating time depends upon the desired viscosity of the paste. This viscosity is permanently measured by the couple. The operation is halted when the couple reaches a set threshold.

Self-heating of the mixer contents does not generally exceed 85° C., but for security it is advisable to make provision for a mixer cooling system which is triggered when there is risk of exceeding 85° C.

The third subject of the invention concerns a soft material obtained from the refractory precursor paste according to the invention.

Under a first form, the paste can be extruded in the form of a yarn or roll of any section. Products obtained in this form have diameters or equivalent diameters generally varying between 4 and 25 mm. These products are conventionally used as seals for oven doors, static oven sealants, casting mould seals in metallurgy, etc.

Under a second form, the paste can be rolled or pressed into sheets or soft strips whose thickness generally varies from a few mm to a few cm. These sheets or strips may be used for inner linings and partitions of industrial furnaces. The application of these linings is facilitated by the flexibility of the material and the ease with which it can be precision cut using ordinary instruments.

Under a third form, the paste can be fragmented into granules. This form can be used to feed machines for subsequent processing of the paste, extruding machines for example.

The fourth subject of the invention concerns the end use of the precursor paste for refractories in various applications such as seals and heat insulators for high temperature use and more particularly:

outer sheath or packing for electric cables fireproof seals or fireproof panels

As it can be extruded, this paste can be used as a component for insulated cables, either as packing or as an outer sheath.

In this application, the paste of the invention offers major advantages in the event of a substantial, untimely rise in temperature: its capacity to rigidify and become refractory and insulating while resisting ignition and with continued non-release of harmful gases (through the use of alumina hydrate as opposed to the use of halogen derivatives) it is possible for an electric cable to maintain its properties of use (transmission of electricity) under extreme conditions such as fire for example.

In the form of a fireproof seal or fireproof panel, the same mechanism of rigidifying and conversion into a refractory material means that the paste can advantageously replace soft materials made from refractory ceramic fibres conventionally used for these applications.

EXAMPLES OF EMBODIMENT

Example 1

A twin-rotor mixer of Banbury type was used fitted with couple follow-up and a heating system. The mixer was preheated to 60° C. and the stirring speed set at 80 rpm. First 40 g alumina powder, having a median diameter of 0.5 micron (quality P 172SB—PECHINEY), were mixed with 40 g of alumina hydrate powder, median diameter of 10 microns (quality SH 100). This first mixing step lasted 10 minutes. Subsequently, 8.8 g (N-aminoethyl-3) aminopropyltrimethoxysilane was added, not hydrolysed previously, and mixing was continued for ten minutes checking that the powder was impregnated in homogeneous manner corresponding to a stabilised mixing couple value. Finally, 16 g EPDM in piece form were added (ethylene propylene diene monomer—Keltan 778 Z obtained from DSM), and 6.4 g plasticizer (Primsol oil 352—ESSO). Mixing was continued for 20 minutes until a threshold couple measurement was reached. The final temperature was 80° C.

The paste obtained was rolled directly and fragmented at room temperature so that it could be added to a twin-screw extruding machine. The temperature was set at between 80 and 90° C. The material was extruded in the form of soft rods 6 mm in diameter and 1.8 m long.

The product obtained was folded over without incurring any damage. A rise in temperature, under air, (300° C./hour) gave a rigid product, with no creep, with no substantial variation in size relative to the initial soft rod and with no flame generation. The product was then subjected to twenty consecutive heat cycles of between 800 and 1200° C. The material remained stable in appearance. Its measured mechanical resistance (three-point bending) was greater than 1 MPa.

Example 2

Another example consists of using an open type roller mixer to prepare the paste, of the type typically used in elastomer industries.

In this case, the silylation agent is a trialkoxysilane previously hydrolysed in silanol.

107 g of this silylation agent were laboratory prepared by mixing 70 g of (3-glycidoxypropol) trimethoxysilane and 37 g of water. Hydrolysis was performed at room temperature using water previously acidified to a pH of 3.5 using acetic acid. At the start of the operation, the solution was cloudy and then became clear, a sign that hydrolysis was completed.

The silanol obtained was immediately mixed with the mineral components made up of 500 g alumina powder, median diameter 0.5 micron (quality P 172 SB—PECHINEY) and 500 g alumina hydrate, median diameter 10 microns (quality SH 100—PECHINEY).

200 g EPDM (Keltan 778 Z—DSM) were mixed in the roller mixer and the above described components were gradually added over a time of approximately 10 min. The rollers were adjusted to a temperature of 65° C. It was not necessary to add a plasticizer to obtain a soft, homogeneous paste. Part of this paste was placed in strip form in a mono-screw extruding machine with low compression force so as to produce a rod having a diameter of 12 mm over a length of 2.5 metres. The remainder of the paste was rolled in sheet form to a thickness of 5 mm. Similar heat treatment to the treatment described in example 1 was applied and gave similar results for both sample forms. The sample in sheet form was cut into 10×10 cm squares and left to rest on its corners: no warping was seen to occur.

Example 3

In this example, the silylation agent used belongs to the silsesquioxane family. As in example 1, a twin-rotor mixer of Banbury type was used, fitted with couple follow-up and a preheating system. The mixer was preheated to 60° C. and the stirring speed set at 80 rpm. First 40 g alumina power, median diameter 0.5 micron (quality P 172 SB—PECHINEY) were mixed with 40 g of alumina hydrate power, median diameter 10 microns (quality SH 100). This first mixing step lasted 10 minutes. Subsequently, 8 g polymethylsilsesquioxane were then added in the form of a 600 g/litre solution in toluene, mixed again for ten minutes and it was checked that the powder was impregnated in homogeneous manner, indicating a stabilised mixing couple value. Finally 16 g EPDM in piece form were added (ethylene propylene diene monomer—reference Keltan 778 Z from DSM).

The use of a plasticizing additive was not necessary. Mixing was continued for 10 minutes until a couple threshold level was reached. The final temperature was 78° C.

The paste obtained was directly rolled then, at room temperature was cut into fragments so that it could be placed in a twin-screw extruding machine. The temperature was set at between 80 and 90° C. The material was extruded in the form a soft rod 6 mm in diameter and 1.6 m in length. The results obtained with heat treatment compared with those given in example 1.

What is claimed is:

1. Paste for refractory material, comprising an elastomer polymer including a mixture of alumina and a material selected from the group consisting of alumina hydrates and magnesium hydroxide, and a silylation agent.

2. Paste according to claim 1 wherein the elastomer polymer is an ethylene propylene diene.

3. Paste according to claim 2, wherein the elastomer polymer is ethylene propylene diene monomer (EPDM).

4. Paste according to claim 1, wherein the alumina is a ground alumina having a particle size of 0.5 to 10 microns, corresponding to a specific surface area of 0.5 to 15 m²/g.

5. Paste according to any of claim 1, wherein the alumina hydrate has a particle size of between 3 and 20 microns.

6. Paste according to claim 1, wherein the silylation agent is a trialkoxysilane.

7. Paste according to claim 6, wherein the silylation agent is (3-glycidoxy propyl) trimethoxysilane.

8. Paste according to claim 6, wherein the silylation agent is (N-aminoethyl-3) aminopropyltrimethoxysilane.

9. Paste according to claim 1, wherein the silylation agent is a polysilsesquioxane.

10. Paste according to claim 1, wherein the silylation agent is a polysilazane.

11. Paste according to claim 1, additionally comprising a plasticizing additive.

12. Paste according to claim 11, wherein the plasticizing additive makes up less than 10% by weight of the paste.

13. Paste according to claim 1, comprising, by weight, alumina 30 to 40%, material selected from the group consisting of alumina hydrates and magnesium hydroxide 30 to 40%, silylation agent 5 to 15%, elastomer polymer 10 to 20%, and plasticizer 0 to 10%.

14. Process for manufacturing a precursor paste for refractory materials according to claim 1, comprising the steps of:

a) preheating a mixer to a temperature of between 40 and 60° C.;

b) adding to the preheated mixer the elastomer polymer, silylation agent, alumina and the material selected from the group consisting of alumina hydrates and magnesium hydroxide, to form a mixture; and c) mixing the mixture until a homogeneous paste is obtained.

15. Process according to claim 14, wherein the silylation agent has been previously hydrolyzed.

16. Process according to claim 15, wherein the hydrolysis of the silylation agent is conducted in a stirred container in which silane is mixed with water having an adjusted pH and the water and silane have a molar ratio of water: silane between 4 and 7.

17. Process according to claim 14, additionally comprising adding a plasticizing additive is added to the mixer.

18. Process according to claim 17, wherein the plasticizing additive is added to the mixer in an amount of less than 10% by weight.

19. Process according to claim 14, wherein the mixer comprises a cooling device which maintains the temperature below 85° C.

20. Soft refractory precursor material in yarn or roll form obtained by extruding the precursor paste for refractory material defined by claim 1.

21. A seal for use at a temperature greater than 300° C. manufactured from the paste according to claim 20.

22. Soft refractory precursor material in the form of sheets or strips obtained by rolling or pressing the precursor paste for refractory material defined by claim 1.

23. A heat insulating material manufactured from the paste according to claim 22.

24. Soft refractory precursor material in the form of granules obtained by fine cutting the precursor paste for refractory material defined by claim 1.

25. A sheath of an electric cable manufactured by incorporating a material according to claim 24 into a material which is extruded through an extrusion die.

26. A fireproof seal or panel manufactured from a paste according to claim 1.

* * * * *